United States Patent [19]

Wirtz

[11] Patent Number: 5,375,691
[45] Date of Patent: Dec. 27, 1994

[54] PEG TRAY TYPE YARN TUBE CARRIER WITH TRANSMITTING RECEIVING DEVICE

[75] Inventor: Ulrich Wirtz, Moenchengladbach, Germany

[73] Assignee: W. Schlafhorst AG & Co., Moenchengladbach, Germany

[21] Appl. No.: 141,255

[22] Filed: Mar. 24, 1994

Related U.S. Application Data

[62] Division of Ser. No. 813,105, Dec. 23, 1991.

[30] Foreign Application Priority Data

Dec. 24, 1990 [DE] Germany .............................. 4041713

[51] Int. Cl.$^5$ .............................................. B65G 47/46
[52] U.S. Cl. .................................. 198/350; 209/927; 242/35.5 A; 198/803.12
[58] Field of Search ................... 209/927, 568, 569; 242/35.5 A; 198/350, 487.1, 803.11, 803.12

[56] References Cited

U.S. PATENT DOCUMENTS

| | | |
|---|---|---|
| 4,681,231 | 7/1987 | Ueda et al. . |
| 4,940,127 | 7/1990 | Kikuchi et al. . |
| 5,021,767 | 6/1991 | Fockens et al. . |
| 5,185,993 | 2/1993 | Fritschi et al. ............. 242/35.5 A X |
| 5,279,729 | 1/1994 | Tone et al. ...................... 209/927 X |
| 5,287,692 | 2/1994 | Matsubayashi ............ 242/35.5 A X |

FOREIGN PATENT DOCUMENTS

| | | |
|---|---|---|
| 3344473A1 | 6/1984 | Germany . |
| 3603002C2 | 3/1990 | Germany . |
| 3912488A1 | 10/1990 | Germany . |
| 2171874 | 7/1987 | Japan ................................. 209/927 |

*Primary Examiner*—D. Glenn Dayoan
*Attorney, Agent, or Firm*—Shefte, Pinckney & Sawyer

[57] ABSTRACT

A peg tray type carrier for transporting textile yarn tubes has a codable, readable and erasable electronic information carrying device such as a memory chip connected to a transmitting-receiving antenna arranged in the area of the central axis of the peg tray to achieve essentially the same effective contactless transmission interval to a compatible transmitting-receiving antenna of a reading, erasing and encoding device, which may be located for example stationarily along a peg tray transport conveyor, essentially without regard to the rotational disposition of the peg tray about its axis. Inductive, capacitive or electromagnetic forms of contactless coupling are possible for information transmission.

3 Claims, 1 Drawing Sheet

PEG TRAY TYPE YARN TUBE CARRIER WITH TRANSMITTING RECEIVING DEVICE

This is a divisional of co-pending application Ser. No. 07/813,105, filed Dec. 23, 1991.

BACKGROUND OF THE INVENTION

The present invention relates to pallet-type carriers of the type commonly referred to in the textile industry as peg trays, for use in transporting textile yarn tubes.

Pallet type yarn tube carriers such as conventional peg trays are well known for transporting textile yarn tubes, whether empty or wound with yarn, in closed transport systems, such carriers basically comprising a tube supporting pin extending in upstanding disposition from a circular base plate by which the carriers are set on transporting conveyor belts. It is also known that such tube carriers can be provided with a permanent marking or other coding which serves for destinational control of these carriers during transport, e.g. to enable a given batch or group of yarn tubes to be delivered to a predetermined winding section or station of a bobbin winding machine, such as representatively disclosed in German Offenlegungschrift DE 33 44 473 A1.

In addition, it is known that the particular permanent coding of the carriers can be associated with the tubes placed therein at a tube supply station and that this association can be stored in a central computer for later retrieval to permit the particular origin of the tube to be recognized, such as representatively disclosed in German Offenlegungschrift DE 36 03 002 C2. Disadvantageously, it is only possible with this method to maintain the simple information about the origin of the type supported on the carrier. Storage of more extensive information, such as, for example, yarn qualities and characteristics, is not possible. Further, the association for all tube carriers being transported in the overall transport system must be constantly stored in the central computer. As a result, no analytical evaluation can be performed at the winding stations by their computer, e.g. recognition of excessively frequent yarn breakages, since the winder's computer does not have access to the stored information about the origin of the yarn tube being unwound, even if a reading device for reading the permanent coding of the carrier may be present at the winding station.

German patent application P 40 38 970.7 suggests that tube carriers may be provided with selectively erasable and encodable information carrying devices, e.g. erasable read-write devices, which makes it possible for each tube carrier to be encoded with, and to store information about, the origin of a yarn tube and any other relevant yarn information when a yarn tube is placed on the carrier. This information can be re-read and/or supplemented at any desired location by a reading, erasing and coding device. The exchange of information to and from the information carrying device described in such patent application is accomplished by rotational positioning of the carrier about its axis by an angular amount based upon the angular disposition of the information carrying device on the tube carrier relative to the reading, erasing and coding device. As disclosed in German Offenlegungschrift DE 39 12 488 A1, the tube carrier can be rotationally positioned in advance of the reading, erasing and coding device so that the information carrying device and the reading, erasing and coding device are directly opposite one another. However, a suitable arrangement for accomplishing such positioning involves a considerable additional expense.

SUMMARY OF THE INVENTION

It is therefore an object of the present invention to provide a yarn tube carrier with a readable, erasable and encodable information carrying means which enables the transmission of information thereto and therefrom with uniform transmission quality without regard to the rotational disposition of the carrier about its central longitudinal axis.

Basically, the present invention is contemplated to be adaptable to virtually any conventional form of peg tray carrier utilized for transporting textile yarn tubes comprising a base plate and a tube supporting pin extending in upstanding relation from the base plate for telescopic insertion into a yarn tube. As will be recognized, the base plate and the tube supporting pin define a central axis of the peg tray type tube carrier, typically extending along the longitudinal center line of the tube supporting pin. According to the present invention, the peg tray includes a selectively encodable, readable and erasable information carrying device and a transmitting-receiving device, such as an antenna, connected to the information carrying device for communication without physical contact with a compatible transmitting-receiving device associated with a device for reading, erasing and encoding of the information carrying device. The transmitting-receiving device for the information carrying device is disposed generally in the region of the central axis of the peg tray to define a generally uniform transmission interval between the transmitting-receiving device for the information carrying device and the compatible transmitting-receiving device for the reading, erasing and encoding device when disposed in proximity thereto, essentially without regard to the rotational disposition of the base plate and the tube supporting pin about the central axis of the peg tray. As a result, special positioning devices conventionally necessary for optimally orienting the peg tray relative to an independent transmitting-receiving device, e.g., by rotating the peg tray about its central axis, are unnecessary and can be eliminated. Moreover, an optimal transmission quality, i.e., without loss of transmitted information, is achieved by provision of a generally constant transmission interval.

In one embodiment, the transmitting-receiving device for the information carrying device comprises a coil having windings arranged concentrically to the central axis of the peg tray to facilitate an inductive coupling of the coil with the compatible transmitting-receiving device for the reading, erasing and encoding device. The coil may be mounted to the base plate in a plane generally parallel to the base plate, which facilitates communication with the compatible transmitting-receiving device for the reading, erasing and encoding device in a direction parallel to the central axis of the peg tray, e.g. from below the peg tray's base plate. For example, the information carrying device may be in the form of a memory chip affixed along with the coil to a silicon wafer which may be attached to the bottom of the base plate of the peg tray or, alternatively, disposed within a hollow interior area within the base plate. Alternatively, the coil may be in the form of a helical winding disposed within the tube supporting pin of the peg tray with the winding generally concentric about the central axis.

In a second embodiment of the present peg tray, the transmitting-receiving device for the information carrying device may include a metal capacitor plate for capacitive coupling with a compatible capacitor plate of the transmitting-receiving device for the reading, erasing and encoding device. In a further embodiment, the transmitting-receiving device for the information carrying device may include a rod-like antenna arranged generally along the central axis of the peg tray for electromagnetic coupling with the compatible transmitting-receiving device for the reading, erasing and encoding device.

The present arrangement of the transmitting-receiving device for the information carrying device at the central axis of the peg tray thus permits a contactless coupling of the information carrying device with an independent transmitting-receiving device of a reading, erasing and encoding device with the considerable advantage that the transmitting-receiving device of the reading, erasing and encoding device can be stationarily arranged in a permanent manner along a conveyor belt or other transport path on which the peg trays are transported. As a result, all parts of the stationary reading, erasing and coding device may be located outside of the transport path of the textile tubes. For example, the transmitting-receiving device for the reading, erasing and encoding device can be advantageously located beneath the peg tray conveyor or other transport path to transmit and receive to and from the bottom of the peg tray base plate.

An inductive coupling between the transmitting-receiving device for the information carrying device and the transmitting-receiving device for the reading, erasing and encoding device has the advantage that the transmitting energy received from the stationary reading, erasing and encoding device can function as a supply current source for the information carrying device. The concentric arrangement of the coil forming the transmitting-receiving device in the tube carrier also permits the formation of a through bore in the tube carrier which empties at the top of the tube support pin in order, if necessary, to blow out a starting end of a yarn present in the textile tube from the bottom of the tube carrier, e.g. when the tube carrier is transported to a winding station of a winding machine. It is advantageous if the memory chip forming the information carrying device is fastened jointly with the transmitting-receiving device on a silicon wafer which can also be designed to be flexible. Such information carrying devices can be mass produced at relatively low costs. Therefore, providing peg trays with such information carrying devices does not involve great expense. If the silicon wafer is attached to a part of the peg tray which can be removed, the wafer can be readily exchanged in case of a defect.

The design of the transmitting-receiving device as a coil with helical windings around the central longitudinal axis of the peg tray in a hollow space within the tube supporting pin permits the transmission of data to a corresponding transmitting-receiving device of a stationary reading, erasing and coding device located above the transport path for the base plates of the peg trays.

As indicated, other designs of the transmitting-receiving devices to achieve a capacitive or electromagnetic coupling are also within the scope of the present invention.

The invention is explained in more detail below with reference made to specific exemplary embodiments.

DESCRIPTION OF THE PREFERRED EMBODIMENTS

Figure 1:
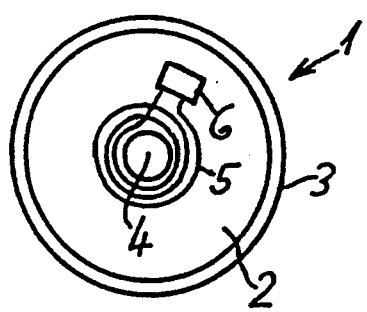
FIG. 1 is a bottom plan view of a peg tray type yarn tube carrier according to one preferred embodiment of the present invention equipped with a concentrically arranged transmitting-receiving coil for inductive coupling with an antenna of a stationary reading, erasing and encoding device from the bottom of the carrier and further equipped with a bore for blowing air therethrough.

Referring now to the accompanying drawings and initially to FIG. 1, a peg-tray type yarn tube carrier, indicated generally at 1, is shown in plan view from the bottom of the circular base plate 2 of the peg tray 1. The base plate 2 is formed with a circumferential beveling 3 about its bottom face which serves, for example, to overcome inconsistencies or other potential impediments in a conveyor or other transport path (not shown) for the peg tray 1. As is conventional, the peg tray has an axially upstanding pin (not shown in FIG. 1) extending centrally from the top side of the base plate 2 for telescopical mounting thereon of a textile yarn tube (also not shown). A central bore 4 is formed axially in the bottom face of the peg tray 1 and extends through the tube supporting pin of the peg tray 1. This bore 4 serves for blowing out the start of a yarn wound on the supported textile yarn tube which yarn is to be supplied, for example, to yarn connecting members of a winding head. The base plate 2 of the peg tray 1 carries an information signal transmitting-receiving device preferably in the form of an antenna coil 5 formed in a spiral winding concentric with the axis of the peg tray 1 and connected at the opposite ends of the coil to a memory chip 6 also carried on the base plate 2. The coil 5 can advantageously be printed or otherwise formed in a simple manner and arranged jointly with the memory chip 6 on a silicon platelet or wafer.

Figure 2:
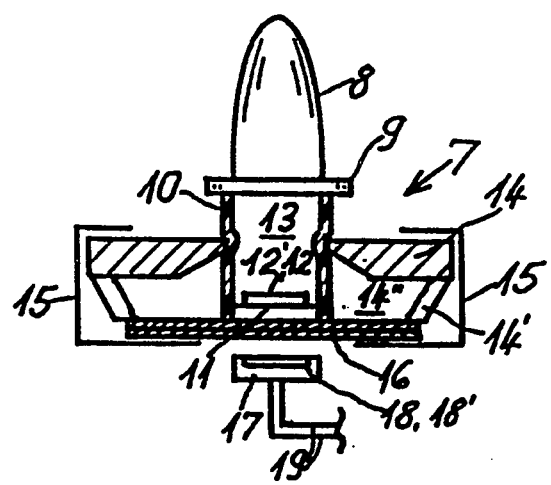
FIG. 2 is an axial cross-sectional view of another embodiment of a yarn tube carrier in accordance with the present invention having a replaceable tube supporting pin assembly.

In order to assure an effective transmission of information to and from the coil 5 and memory chip 6 during transport of the peg tray 1, a compatible information signal transmitting-receiving device capable of reading, erasing and encoding the memory chip 6, preferably including a corresponding antenna coil 18, should be stationarily arranged along the transport path of the peg tray 1 to enable an inductive coupling of the coil 5 on the peg tray 1 with the coil 18, as representatively shown in FIG. 2. In this manner, the transmission of information can readily take place from beneath the peg tray 1 through a conveyor belt 16 in the transport path by which the peg tray 1 is supported and transported. It is possible, by means of this manner of inductive coupling, to filter out, for example, the carrier frequency with which a binary-coded, transmitted signal is received by the peg tray coil 5 in order to use the received transmitting energy as a supply current source for the memory chip 6. Such a technique has already been described in German patent application P 40 38 970.7, which therefore need not be explained in greater detail herein.

In FIG. 2, an alternative embodiment of peg tray according to this invention is indicated generally at 7. The peg tray 7 has a circular base formed of a circular disk-like cover plate 14 and a tapered outer ring 14' affixed to the underside of the cover plate 14 at its periphery, the cover plate 14 and the outer ring 14' defining a downwardly open hollow interior space 14" within the peg tray base. A tube supporting pin 8 extends in upstanding disposition coaxially through the cover plate 14 of the peg tray 7 and includes a lower lug portion 10 having a cylindrical outer wall which defines a hollow interior space 13 and which is yieldable for insertion through the cover plate 14 into the hollow interior 14" of the base. In this manner, the tube support pin 8 may be selectively removed from the peg tray base and replaced if necessary or desirable. The hollow space 13 within the lug portion 10 is closed at its lower end by a bottom plate 11, which is also replaceable. A silicon platelet or wafer 12 is adhered to the upper surface of bottom plate 11 and carries a transmitting-receiving antenna preferably in the form of a coil and memory chip unit as described above.

The formation of the base of the peg tray 7 with the hollow interior space 14" makes it possible to achieve a positive transport of the peg tray 7 at certain transport sections with the aid of cams or other transport elements which can be engaged into this hollow space. The transport path may be formed, for example, as shown in FIG. 2, by means of a pair of laterally spaced opposed facing guide tracks 15 and a conveyor belt 16 extending within the tracks 15, by which the peg trays are entrained by frictional contact with the belt 16. The transmitting-receiving coil antenna of the stationary reading, erasing and encoding coil antenna device 18 is arranged on a reading, erasing and encoding head 17 which can be connected via suitable leads 19 to an appropriate controller, e.g. to the computer of a winding head on a textile winding machine.

As those persons skilled in the art will recognize, it is also possible that, instead of the silicon wafer or platelet 12, the transmitting-receiving antenna of the peg trays of this invention may alternatively include a metal plate, card, or disk, as can the transmitting-receiving antenna of the stationary reading, erasing and encoding device 18. In such case, each plate, card or disk acts as a capacitor plate 12', 18' essentially to achieve a capacitive coupling of their respective coils. In addition, battery-buffered memory chips may be advantageously used.

Figure 3:
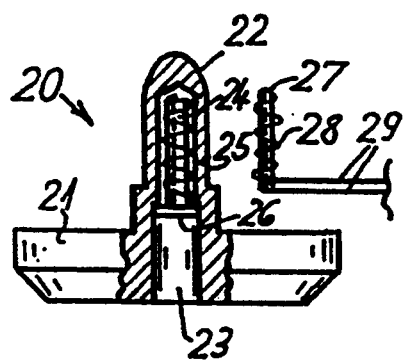
FIG. 3 is another axial cross-section of a third embodiment of a tube carrier of the present invention wherein a transmitting-receiving coil consisting of a helical winding is arranged axially within the tube support pin of the carrier.

Another embodiment of peg tray is indicated at 20 in FIG. 3 and comprises a base plate 21 formed with a bore 23 extending into the tube support pin 22, into which bore is inserted a winding core 24 wound with a helical coil winding 25. The ends of the winding 25 extend into a silicon wafer 26 and are attached to a memory chip (not shown) carried by the wafer. This winding unit of the core 24 and winding 25 forms a transmitting-receiving antenna which can be coupled essentially inductively to a compatible stationary transmitting-receiving reading, erasing and encoding device, which similarly comprises a winding core 27 and a helical winding 28. This antenna 27, 28 is connected via leads 29 to a suitable controller, e.g., to a computer at a winding station of a winding machine.

Figure 4:
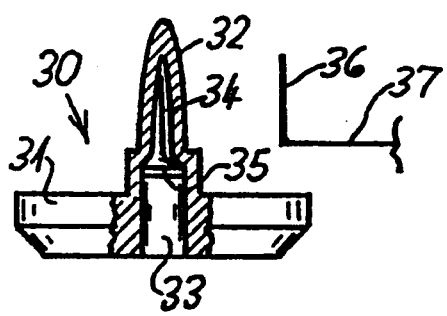
FIG. 4 is another axial cross-section of a further embodiment of a tube carrier of the present invention having a rod-like antenna arranged in the tube support pin for electromagnetic coupling with a corresponding antenna of a stationary reading, erasing and encoding device.

Another peg tray 30 is shown in FIG. 4 and includes a base plate 31, an upstanding tube supporting pin 32, and a rod-type antenna device 34 inserted into a central bore 33 extending through the pin 32. The rod antenna 34 is likewise connected to a silicon wafer 35 carrying a memory chip (not shown) and serves to facilitate an electromagnetic coupling to a compatible rod-like antenna device 36 of a reading, erasing and encoding device, which is connected via a lead 37 to the other components of the reading, erasing and encoding device. The rod antenna 36 can be screened by a metallic reflector (not shown) for directional control of the signals transmitted and received thereby.

As will be understood from the foregoing embodiments, the present invention is not restricted to any special form of information transmitting-receiving devices, antenna or the like nor any particular form of contactless electrical coupling between the information carrying device of the peg tray and the associated stationary reading, erasing and encoding device. The essential advantage of the contactless coupling achieved by the present invention resides in the simple design of the information carrying device as well as in the uncomplicated coupling between the information carrying device and the stationary reading, erasing and encoding device.

It is also advantageous that, as a result of the arrangement of the transmitting-receiving antenna within a peg tray according to this invention, it is possible to accomplish an effective contactless coupling between the peg tray antenna and a stationary reading, erasing and encoding device through its transmitting-receiving antenna for transmission of information therebetween as the peg tray travels in proximity to the stationary device without the necessity of stopping the peg tray.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A carrier for transporting a textile yarn tube comprising a base plate, a tube supporting pin extending in upstanding relation from the base plate for telescopic insertion into a yarn tube, a selectively encodable, readable and erasable information carrying device, and a transmitting-receiving device connected to the information carrying device for communication without physical contact with a device for reading, erasing and encoding thereof having a compatible transmitting-receiving device, the base plate and the tube supporting pin defining a central axis of the tube carrier, the transmitting-receiving device for the information carrying device being disposed generally in the region of the central axis to define a generally uniform transmission interval between the transmitting-receiving device for the information carrying device and the compatible transmitting-receiving device for the reading, erasing and encoding device when disposed in proximity thereto essentially without regard to the rotational disposition of the base plate and tube supporting pin about the central axis, the information carrying device comprising a memory chip, the memory chip and the transmitting-receiving device therefor being affixed to a silicon wafer, the base plate having a substantially enclosed hollow interior area and the silicon wafer being disposed within the hollow interior area.

2. A peg tray type yarn tube carrier according to claim 1 wherein the transmitting-receiving device for the information carrying device is mounted to the base plate in a plane generally parallel to the base plate for communication with the compatible transmitting-receiving device for the reading, erasing and encoding device in a direction generally parallel to the central axis.

3. A peg tray type yarn tube carrier according to claim 1, wherein the transmitting-receiving device for the information carrying device comprises a coil having a winding arranged concentrically to the central axis to facilitate an inductive coupling of the coil with the compatible transmitting-receiving device for the reading, erasing and encoding device.

* * * * *